J. L. TRIPLER.
Refrigerating Apparatus.

No. 140,321.  Patented June 24, 1873.

4 Sheets--Sheet 1.

Witnesses:
Millard F. Walton,
Robert H. Hox.

Inventor:
Jacob L. Tripler.
by Dispersheim
Attys.

AM. PHOTO-LITHOGRAPHIC CO. N.Y. (OSBORNE'S PROCESS)

4 Sheets--Sheet 2.
J. L. TRIPLER.
Refrigerating Apparatus.
No. 140,321. Patented June 24, 1873.
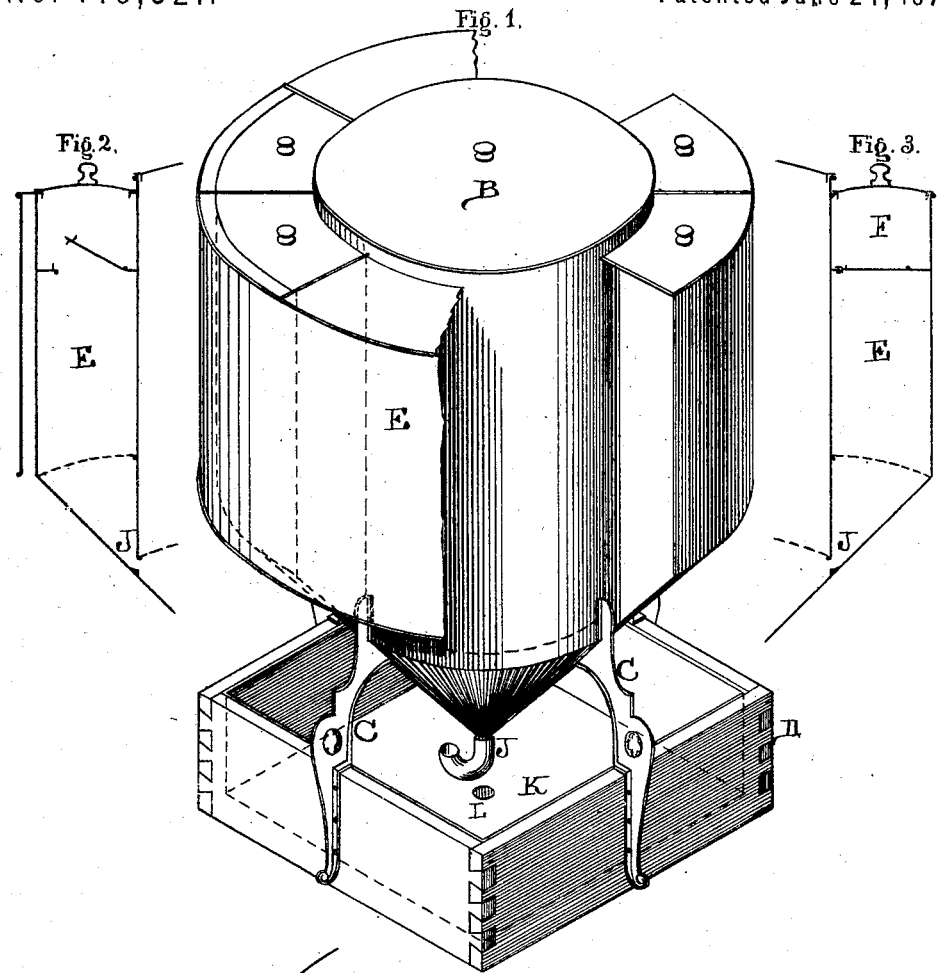
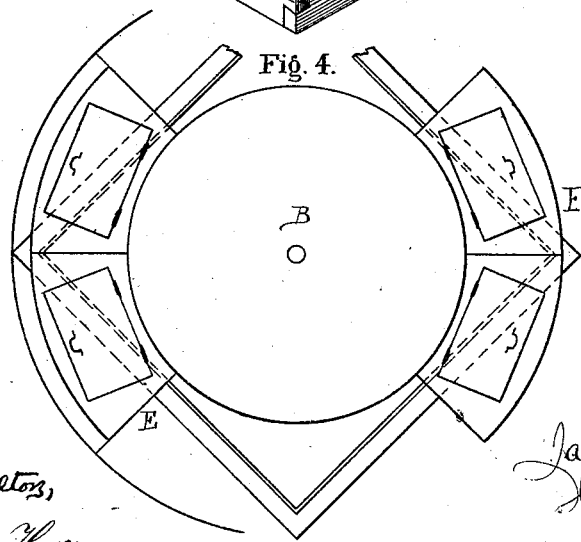
Witnesses:
Millard F. Walton,
Robert H. Hoz.
Inventor:
Jacob L. Tripler
by John Wiedersheim
Attys.

J. L. TRIPLER.
Refrigerating Apparatus.
No. 140,321. Patented June 24, 1873.
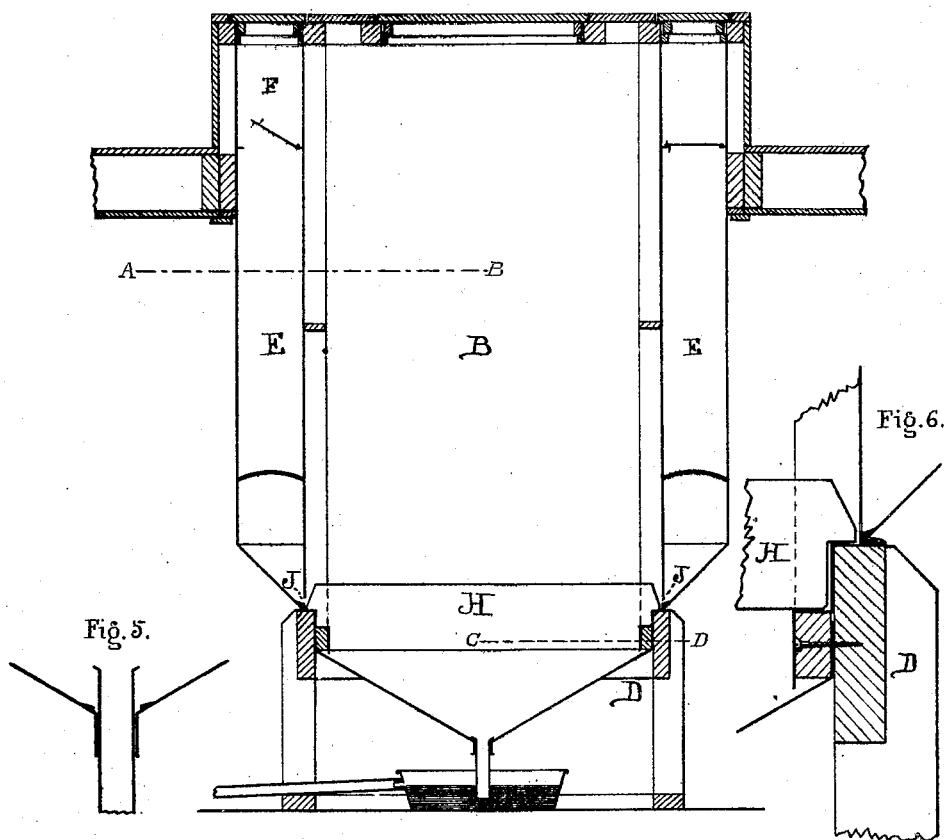
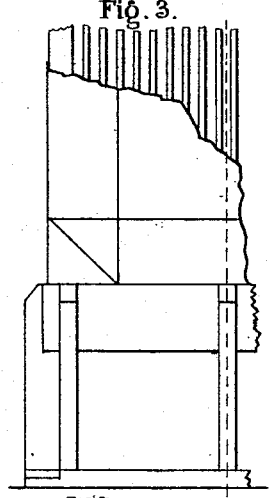
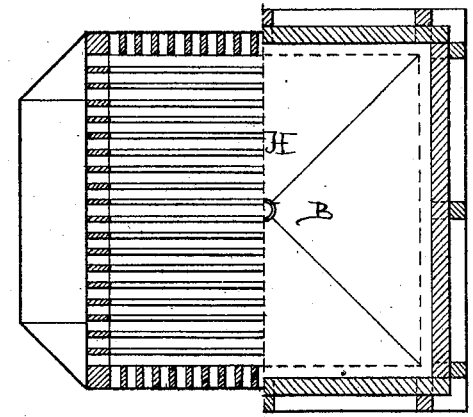
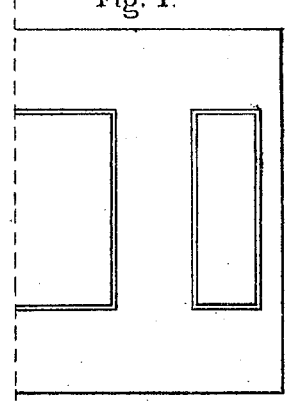
Witnesses:
Millard F. Walton,
Robert H. Hoz.
Inventor:
Jacob L. Tripler
by
Joshua Pusey &co.
Attys.

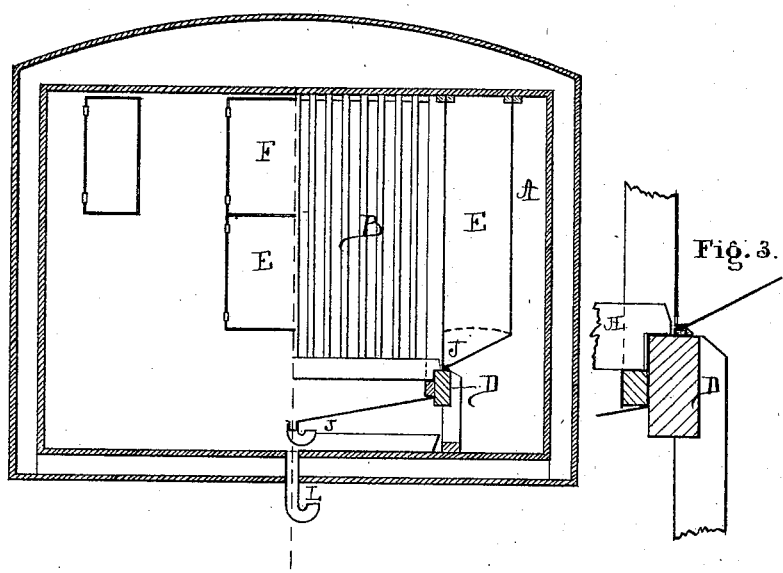
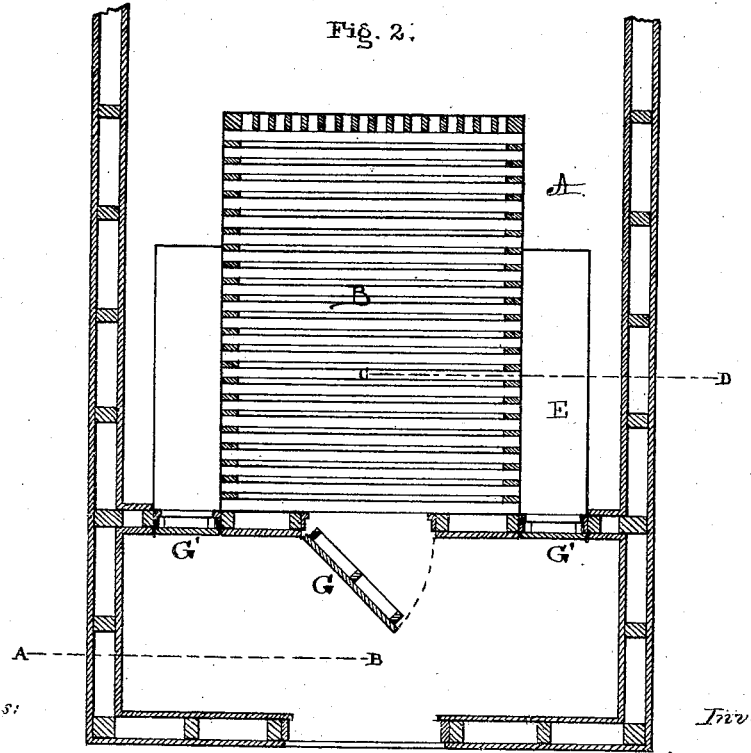

UNITED STATES PATENT OFFICE.

JACOB L. TRIPLER, OF MERCHANTVILLE, NEW JERSEY.

IMPROVEMENT IN REFRIGERATING APPARATUS.

Specification forming part of Letters Patent No. 140,321, dated June 24, 1873; application filed May 13, 1873.

*To all whom it may concern:*

Be it known that I, JACOB L. TRIPLER, of Merchantville, in the county of Camden and State of New Jersey, have invented a new and useful Improvement in Refrigerating Apparatus; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1:
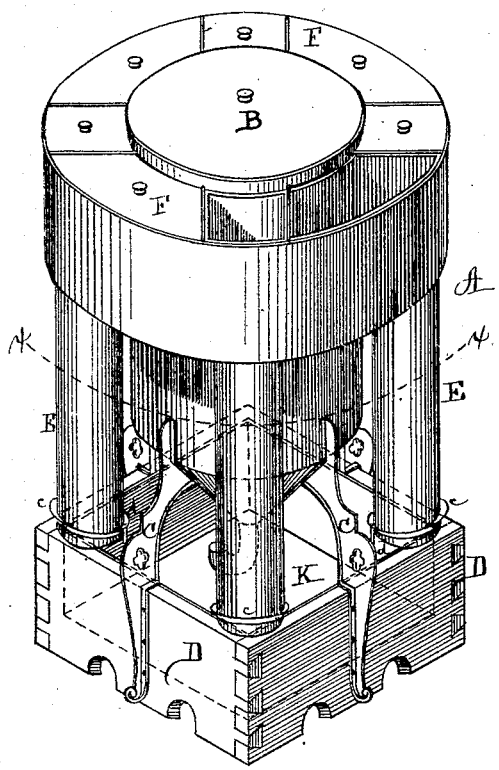
Figure 2:
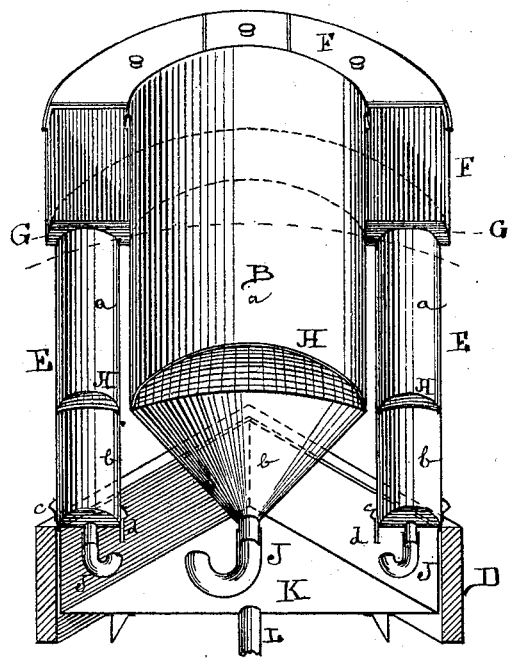
Figure 3:
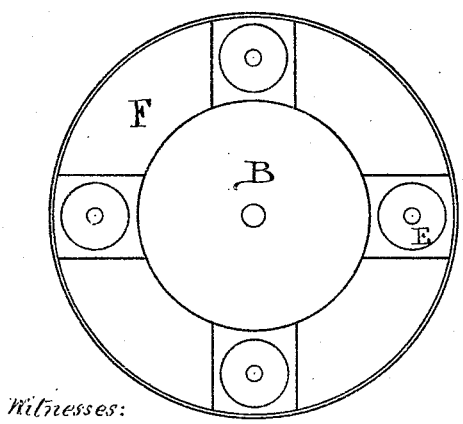
Figure 4:
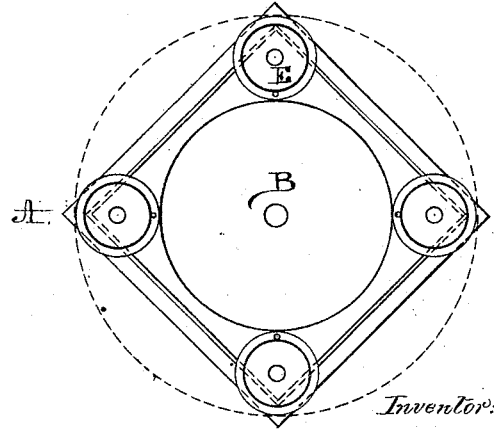

Figure 1 is a perspective view of the device embodying my invention. Fig. 2 is a central vertical section thereof. Fig. 3 is a top or plan view. Fig. 4 is a horizontal section in line *x x*, Fig. 1.

Sheet 2 illustrates modifications applicable for more extensive purposes than Fig. 1. Sheet 3 illustrates the invention applicable for refrigerating-houses. Sheet 4 illustrates the invention applicable to refrigerating-cars.

Similar letters of reference indicate corresponding parts in the several figures.

This invention consists in non-inclosed freezing-tubes surrounding the ice-receiving chamber, so that cold air is produced by direct radiation from both the freezing-tubes and ice-chamber at their sides and bottom. It also consists in an ice-receiving receptacle or stowage surrounded by freezing-chambers, in order to preserve the ice and assist refrigeration. It also consists in cold-air spaces at the bottom of the ice-chamber and freezing-tubes. It also consists in compartments applied to the refrigerating apparatus for cooling articles independently of the articles in the room in which the apparatus is located. It also consists in means for collecting the condensed matters or "sweat" on the freezing-tubes.

Referring to the drawings, A represents the refrigerating apparatus adapted to be located in a box, room, or apartment having properly-constructed non-conducting walls.

In Sheet 1 the apparatus is designed for family or household purposes.

It consists of an ice-receiving cylinder or chamber, B, which is supported on brackets or uprights C, resting on a frame, D, which constitutes the base of the apparatus. From the base D there rise a series of tubes, E, which encircles the ice-chamber B, and has arranged above them a series of compartments, F, which surround the upper portion of the chamber B, and are separated from the tubes E by covers G, which close the tops of the tubes and afford means of access to said tubes.

Within the tubes and chambers I place gratings H, which divide said tubes and chambers into compartments *a b*, and at the bottoms of the chambers and tubes there are connected water-discharge pipes J, which respectively communicate with the tubes and chamber, and direct water from said parts into a pan, K, formed by or in the frame or base D, said water being subsequently discharged by a pipe, L, which extends from the base outside of the box, or other place of application of the apparatus. The pipes J J L will be provided with traps to prevent the entrance of air through said pipe into the box and the tubes and chamber. The tubes E will receive a freezing-mixture (say, ice and salt) above the gratings H, and the chamber B will be well packed with ice above its grating H, and constitute the place of supply for the ice which may be required for other purposes. The chamber B will have a suitable cover, and access is had thereinto by removing the cover. Access is had to the tube E by removing the covers of the top compartments F, and the covers G between the compartments and tubes.

The melted matters from the tubes and chamber pass out of the pipes J into the pan K, as has been stated, and the vapors of condensation, or sweat, on the tubes may be collected by collars *c* on the tubes, and conveyed by pipes *d* into the pan.

The various articles to be cooled or refrigerated are hung, laid, or otherwise placed in the box or apartment in which the apparatus A is located, and articles such as butter, milk, &c., which might be effected by odor of the articles in the box are stored in the compartments F.

The cold that is naturally produced by the freezing-mixture in the tubes radiates from the sides and bottom of the tubes and joins that from the sides and bottom of the chamber B, thus cooling the air in the receiving-box of the apparatus, and subjecting the various articles in the box and compartments F to the influences of said cold. At the same time the chamber B is kept so thoroughly cold that the ice therein is almost kept from melting, and thus a full supply thereof may always be kept on hand. The ice and freezing-mixture occupy the respective compartments $a$ and rest on the gratings H, and the compartments $b$ constitute cold-air spaces, the cold air acting on the under side of the ice and assisting to preserve the same. The tubes and chamber, and the various pipes, are made removable for purposes of cleansing, repairs, &c.

In Sheet 2 the apparatus is shown as designed for more extensive purposes, to be used by grocers, butchers, dairymen, &c.

In this case the freezing-chambers, or tubes E, completely encircle the central chamber B, and the melted matters from the same pass out through openings J into the bottom of the chamber B, and are discharged in a manner similar to that already stated.

In Sheet 3, the apparatus rests on a frame on the floor of one room of a cooling or curing house, and extends from the floor of the room above. The grating H is placed on the frame D, which supports the apparatus. The freezing chamber or tubes are on the sides or surround the ice-chamber B, and the water from the tubes and chamber is discharged by means previously stated.

The invention is readily applicable to cars, as seen in the figures of Sheet No. 4, the construction of the parts of which being similar to those in Sheet 3, and of the same general principle of operation. The doors G leading to the freezing chambers or tubes E, and the chamber B, will be preferably arranged at the sides thereof, in order to be most conveniently reached for purposes of filling, replenishing, cleansing, &c.

Having thus described my invention, what I claim as new, and desire to secure by Letters Patent, is—

1. The non-inclosed freezing-tubes E E surrounding the ice-receiving chamber B, so that cold air is produced by direct radiation from the freezing-tubes and ice-chamber, at their sides and bottom, substantially as set forth.

2. An ice-receiving receptacle, B, surrounded by freezing-chambers, substantially as and for the purpose set forth.

3. The ice-receiving chamber B and freezing-tubes E formed with gratings H H, elevated above the bottoms of said chamber and tubes, so as to leave cold-air spaces below said gratings, substantially as and for the purpose set forth.

4. The compartments F applied to a refrigerating-apparatus, which refrigerates the room in which the apparatus is located, substantially as and for the purpose set forth.

5. The collars $c$ on the tubes E, for directing condensed matters to a place of collection, substantially as set forth.

The above signed by me this 15th day of March, 1873.

JACOB L. TRIPLER.

Witnesses:
JOHN A. WIEDERSHEIM,
MILLARD F. WALTON.